(12) United States Patent
Zhai et al.

(10) Patent No.: US 11,973,744 B2
(45) Date of Patent: Apr. 30, 2024

(54) SYSTEMS AND METHODS FOR ESTABLISHING CONSENSUS IN DISTRIBUTED COMMUNICATIONS

(71) Applicants: Beijing Wodong Tianjun Information Technology Co., Ltd., Beijing (CN); New Jersey Institute of Technology, Newark, NJ (US); Institute of Software, Chinese Academy of Sciences, Beijing (CN)

(72) Inventors: Xinlei Zhai, Beijing (CN); Qiang Tang, Cliffside Park, NJ (US); Zhenliang Lu, Kearny, NJ (US); Jing Xu, Beijing (CN); Zhenfeng Zhang, Beijing (CN); Bingyong Guo, Beijing (CN)

(73) Assignees: New Jersey Institute of Technology, Newark, NJ (US); Beijing Wodong Tianjun Information Technology Co., Ltd., Beijing (CN); Institute of Software, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/924,906

(22) PCT Filed: May 12, 2020

(86) PCT No.: PCT/CN2020/089873
§ 371 (c)(1),
(2) Date: Nov. 11, 2022

(87) PCT Pub. No.: WO2021/226846
PCT Pub. Date: Nov. 18, 2021

(65) Prior Publication Data
US 2023/0188597 A1 Jun. 15, 2023

(51) Int. Cl.
*H04L 9/40* (2022.01)
*G06Q 20/40* (2012.01)
*H04L 67/104* (2022.01)

(52) U.S. Cl.
CPC ....... *H04L 63/0435* (2013.01); *G06Q 20/401* (2013.01); *G06Q 20/4016* (2013.01); *H04L 67/1051* (2013.01)

(58) Field of Classification Search
CPC ..... H04L 63/0435; H04L 63/20; H04L 63/12; H04L 9/3255; H04L 9/3247;
(Continued)

(56) References Cited

U.S. PATENT DOCUMENTS

2019/0147438 A1* 5/2019 Micali ............... G06Q 20/4016
705/71
2019/0190896 A1* 6/2019 Singh .................. H04L 63/0435
(Continued)

FOREIGN PATENT DOCUMENTS

| CN | 106445711 A | 2/2017 |
| CN | 108769173 A | 11/2018 |

(Continued)

OTHER PUBLICATIONS

PCT International Search Report and Written Opinion dated Dec. 30, 2020 for PCT/CN2020/089873.

*Primary Examiner* — Kyung H Shin
(74) *Attorney, Agent, or Firm* — McCarter & English, LLP

(57) ABSTRACT

Described in detail herein is a system for determining the validity of a transaction in a distributed network environment. The system includes a plurality of peer servers. The system elects a set of peer leaders from the plurality of peer servers. The set of peer leaders broadcast a first set of indices associated with a first subset of transactions, received from (Continued)

the plurality of peer servers, to one or more of the plurality of peer servers. The set of elected peer leaders execute a first instance of a binary agreement protocol based at least in part on a second subset of indices associated with a second subset of the transactions. The set of elected peer leaders output a consensus vector comprising one or more of the transactions.

20 Claims, 11 Drawing Sheets

(58) Field of Classification Search
CPC ... H04L 9/3263; H04L 63/123; H04L 9/3265; H04L 9/00; H04L 67/1051; H04L 9/0836; H04L 9/0637; H04L 67/00; H04L 9/0643; H04L 9/3239; H04L 9/30; H04L 9/3297; G06F 21/6236; G06F 21/62; G06F 16/00; G06F 16/1837; G06F 11/00; G06F 3/00; G06Q 20/4016; G06Q 20/389; G06Q 30/0207; G06Q 20/3829; G06Q 20/3825; G06Q 20/401; G06Q 20/3678; G06Q 20/3827; G06Q 20/02; G06Q 20/223; G06Q 20/38215; G06Q 20/065

See application file for complete search history.

(56) References Cited

U.S. PATENT DOCUMENTS

| | | |
|---|---|---|
| 2020/0034571 A1 | 1/2020 | Fett |
| 2021/0099312 A1* | 4/2021 | Guo .................... G06Q 20/401 |

FOREIGN PATENT DOCUMENTS

| | | |
|---|---|---|
| CN | 108810077 A | 11/2018 |
| CN | 109377229 A | 2/2019 |
| CN | 111047470 A | 4/2020 |

* cited by examiner

SYSTEMS AND METHODS FOR ESTABLISHING CONSENSUS IN DISTRIBUTED COMMUNICATIONS

CROSS-REFERENCE TO RELATED PATENT APPLICATIONS

The present application is a 35 U.S.C. § 371 National Stage of International Patent Application No. PCT/CN2020/089873, filed on May 12, 2020, the content of which is incorporated by reference herein in its entirety.

BACKGROUND

A *byzantine* fault tolerant protocol may generally refer to a set of protocols that enable a set of untrusted computing devices in a distributed network to reach a consensus about one or more transactions that have been received by one or more servers in the distributed network. The distributed network may be managed in a peer-to-peer network or by a private entity.

SUMMARY

Exemplary embodiments of the present disclosure are related to an efficient, scalable, and fast asynchronous BFT protocol is described that has a computational complexity up to $O(N)$ for each transaction thereby enabling more peers to join a WAN comprising an ever growing number of peers. Because the computational complexity of the asynchronous BFT protocol is $O(N)$, which is less than $O(N^2)$, the protocol scales much more efficiently than most of conventional asynchronous BFT protocols.

Described in detail herein is a system for determining the validity of a transaction in a distributed network environment. In accordance with embodiments of the present disclosure, the system can include a plurality of peer servers, wherein a first peer server of the plurality of peer servers includes one or more processors and a memory storing computer-executable instructions. When the one or more processors execute the computer-executable instructions, the system can elect at least one peer leader from the plurality of peer servers. The system can further broadcast a first set of indices associated with a first subset of transactions, received from the plurality of peer servers, to one or more of the plurality of peer servers. The system can further execute a first instance of a binary agreement protocol based at least in part on a second subset of indices associated with a second subset of the transactions. The system can further output a consensus vector comprising one or more of the transactions.

In accordance with embodiments of the present disclosure, the plurality of peer servers can be elected to be peer leaders. The peer servers that are elected to be peer leaders can be based at least in part on a number of the plurality of peer servers that are assumed to be untrustworthy or faulty. In some embodiments, the plurality or peer servers elected to be peer leaders is a first subset of the plurality of peer servers.

The one or more processors can generate a set of indices, wherein the set of indices corresponds to the first subset of the plurality of peer servers from which the one or more processors received the first subset of transactions. The one or more processors can further be configured to receive the second subset of the transactions from a second subset of the plurality of peer servers. The one or more processors can further be configured to input a first value into the first instance of the binary agreement protocol based at least in part on the second subset of indices.

In some embodiments, the first input value can be a binary number. The one or more processors can be further configured to output the consensus vector based at least in part on the determination that the at least one second instance of the binary agreement protocol has output the first value.

In accordance with embodiments of the present disclosure, a method for determining the validity of a transaction in a distributed network environment is described herein. The method can include electing at least one peer leader from a plurality of peer servers. The method can further include broadcasting a first set of indices associated with a first subset of transactions, received from the plurality of peer servers, to one or more of the plurality of peer servers. The method can further include executing a first instance of a binary agreement protocol based at least in part on a second subset of indices associated with a second subset of the transactions. The method can further include outputting a consensus vector comprising one or more of the transactions.

The one or more of the plurality of peer servers can be elected to be peer leaders. A number of the plurality of peer servers can be elected to be peer leaders is based at least in part on a number of the plurality of peer servers that are assumed to be untrustworthy or faulty. The one or more of the plurality of peer servers elected to be the peer leaders can be a first subset of the plurality of peer servers.

The method can further include generating a set of indices, wherein the set of indices corresponds to the first subset of the plurality of peer servers from which the one or more processors received the first subset of transactions. The method can further include receiving the second subset of the transactions from a second subset of the plurality of peer servers. The method can further include inputting a first value into the first instance of the binary agreement protocol based at least in part on the second subset of indices.

The first input value can be a binary number. And the method can further include determining at least one second instance of the binary agreement protocol that has output the first value.

In accordance with embodiments of the present disclosure, a non-transitory computer-readable medium storing computer-executable instructions stored therein which cause the at least one processor to determine the validity of a transaction in a distributed network environment is disclosed herein. The at least one processor can execute the computer-executable instructions thereby causing the at least one processor to perform the operations of electing at least one peer leader from a plurality of peer servers. The computer-executable instructions can further cause the at least one processor to perform the operations of broadcasting a first set of indices associated with a first subset of transactions, received from the plurality of peer servers, to one or more of the plurality of peer servers. The computer-executable instructions can further cause the at least one processor to perform the operations of executing a first instance of a binary agreement protocol based at least in part on a second subset of indices associated with a second subset of the transactions. The computer-executable instructions can further cause the at least one processor to perform the operations of outputting a consensus vector comprising one or more of the transactions.

Any combination and/or permutation of embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE FIGURES

Illustrative embodiments are shown by way of example in the accompanying figures and should not be considered as a limitation of the present invention. The accompanying figures, which are incorporated in and constitute a part of this specification, illustrate one or more embodiments of the invention and, together with the description, help to explain the invention. In the figures.

DETAILED DESCRIPTION

Figure 1:
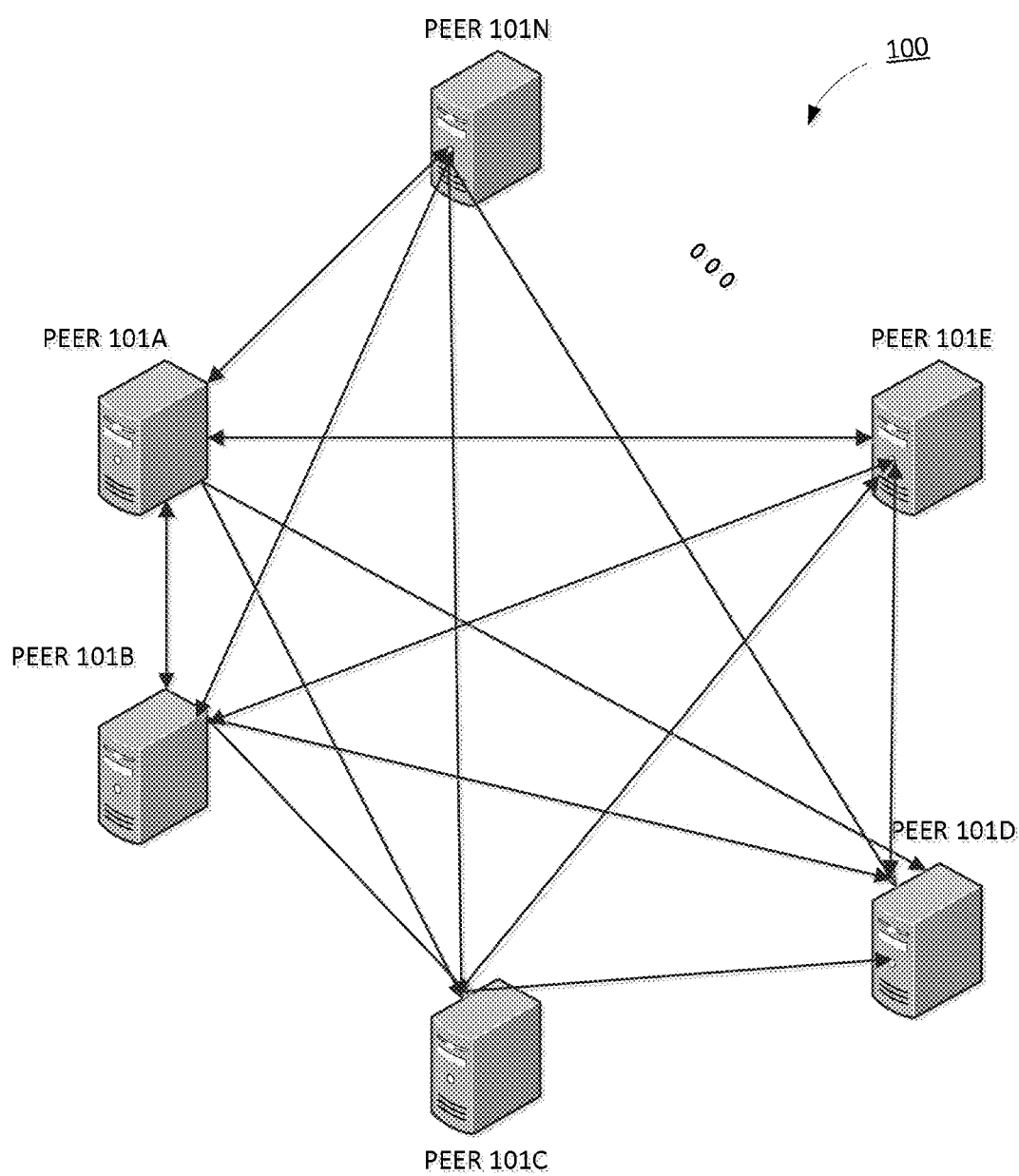
FIG. 1 illustrates an exemplary network environment in accordance with an exemplary embodiment.

With recent advances in blockchain technology, broader application scenarios are possible that require consensus protocols that can be deployed more frequently in wide-area networks (WANs) spanning different private networks as opposed to in-house private networks. One way to achieve this is through asynchronous byzantine fault tolerant (BFT) protocols, which can provide robust consensus protocols in the face of network failures that might occur across one or more private networks making up the WAN. For example, the open Internet environment provides a more adversarial setting than a single privately implemented WAN where connections between computing devices (also referred to as peers) within the open Internet environment could be unreliable.

Most consensus protocols are typically developed in-house for private networks and are proprietary. Such consensus protocols typically rely on a very strict set of requirements. Many of these in-house private network consensus protocols are based on the requirements of synchronous (or partially synchronous) BFT protocols, and usually only perform well in private networks with well-connected peers that guarantee delivery of transactions within a certain time constraint. In contrast to synchronous BFT protocols, asynchronous BFT protocols relax the time and guaranteed delivery constraints, and enable peers to determine a consensus for transactions in the face of network failures. Because of this, asynchronous BFT protocols can be more responsive than synchronous protocols.

Synchronous protocols are typically designed based on an assumed latency of the network, which is normally chosen to be large enough so that the actual network latency is smaller than any latency that the network might reasonably expect to experience. As a consequence, the efficiency of a synchronous BFT protocol depends on the assumed network latency. Asynchronous BFT protocols are generally more efficient than synchronous BFT protocols because asynchronous BFT protocol does not rely on any time assumptions and asynchronous BFT protocols are able to generate a consensus as soon as transactions are delivered to the peers participating in the generation of the consensus of a transaction. Additional because asynchronous BFT protocols do not rely on any time assumptions and a consensus can be generated as soon as transactions are delivered from participating peers, asynchronous BFT protocols are typically more responsiveness than synchronous BFT protocols because performance of asynchronous BFT protocols is based on the actual network bandwidth.

Although asynchronous BFT protocols are more efficient than synchronous protocols, some asynchronous BFT protocols can be inefficient in their usage of bandwidth (i.e., due to computational complexity). For example, the HoneyBadgerBFT protocol has a message complexity of $O(N^3)$, a round complexity of $O(\log N)$, and a communication complexity of $O(N^2|m|)$ per bit. The message size, or size of a transaction, is denoted by m. The performance of these protocols begin to degrade significantly as the side of the network (number of peers participating in the protocol) increases, which can make scaling consensus protocols using these conventional asynchronous protocols impractical or difficult.

In the instant application, embodiments of an efficient, scalable, and fast asynchronous BFT protocol is described that has a message computational complexity up to $O(N^2)$, a round complexity of $O(1)$ per bits, and a computational complexity of $O(N^2|m|)$ per bit for each transaction thereby enabling more peers to join a WAN comprising an ever growing number of peers. Because the message complexity of the fast asynchronous BFT protocol is $O(N^2)$, which is less than $O(N^3)$, the protocol scales much more efficiently than most of conventional asynchronous BFT protocols. Further because the round complexity of the fast asynchronous BFT protocol disclosed herein is $O(1)$ per bits and the round complexity of conventional asynchronous BFT protocols is $O(\log N)$ the round complexity of the fast asynchronous BFT protocol does not increase with the number of peers in the network. Accordingly, the round complexity is deterministic and not probabilistic leading to an increase in efficiency.

FIG. 1 illustrates an exemplary network environment in accordance with an exemplary embodiment. Network 100 can provide a distributed environment and can include multiple servers, associated with one or more organizations, companies, entities or groups of individuals seeking to reach a consensus about one or more transactions (e.g., one or more blockchain transactions) that are received at the network 100. For example, peer 101A can receive one or more transactions that it may need to verify are correct/valid. Peer 101A can transmit the one or more transactions to all peers in network 100 and peers 101A-N can execute a consensus protocol to generate a consensus about the one or more transactions thereby enabling peer 101A to verify the validity of the one or more transactions.

Figure 9:
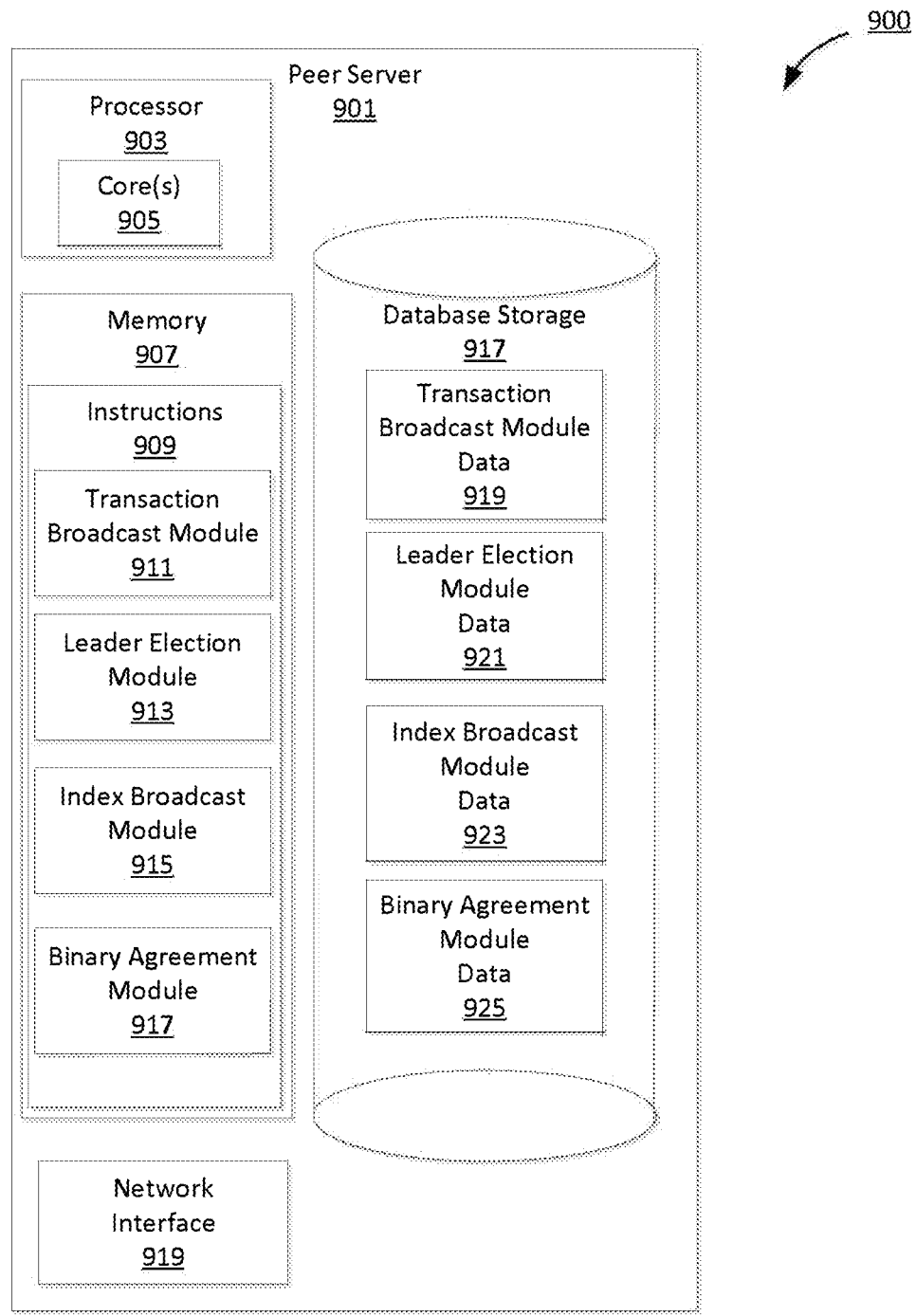
FIG. 9 illustrates a block diagram of an exemplary computing device in accordance with an exemplary embodiment.

An example embodiment of each of peers 101A-N can be configured in accordance with FIG. 9. Network 100 can be an asynchronous network, which can consist of asynchronous fully-meshed authenticated point-to-point (p2p) channels between peers 101A-N. An established authenticated p2p channel can be established between any two peers in Network 100. It should be noted that an adversary can fully control the delivery of transactions over all p2p channels (i.e., the adversary can arbitrarily delay the delivery of transactions, but any transactions transmitted by an honest peer will eventually be delivered to its intended destination. A natural consequence of this is that the adversary can arbitrarily reorder a sequence of transactions. However, despite this, Network 100 will deliver any transactions from an honest peer.

A peer may be an honest peer if that peer behaves in the way that nodes (e.g., other peers) in network 100 would expect the peer to behave. This means that an honest peer does not try to modify history, transmits transactions correctly, transmits messages correctly, transmits correctly formatted messages and data, etc. Conversely an adversarial peer is the exact opposite and can be a malicious peer that does not behave in the way that nodes in network 100 would expect a peer to behave. Adversarial peers may send malformed messages, send incorrect data, send too much or too little data, etc.

Peers 101-N can be connected in Network 100 via a WAN, the Internet, a cellular network, wireless interoperability for Microwave Access (WiMAX) network, plain old telephone service (POTS), and/or any combination of the aforementioned network types.

Peers 101A-N can execute a broadcast transaction module, leader election module; index broadcast module, and binary agreement module to verify the validity of a transaction that any of peers 101A-N may receive. These modules are described in more detail with reference to FIG. 9 and their corresponding functions are described in more detail with reference to FIGS. 3-8.

Figure 2:
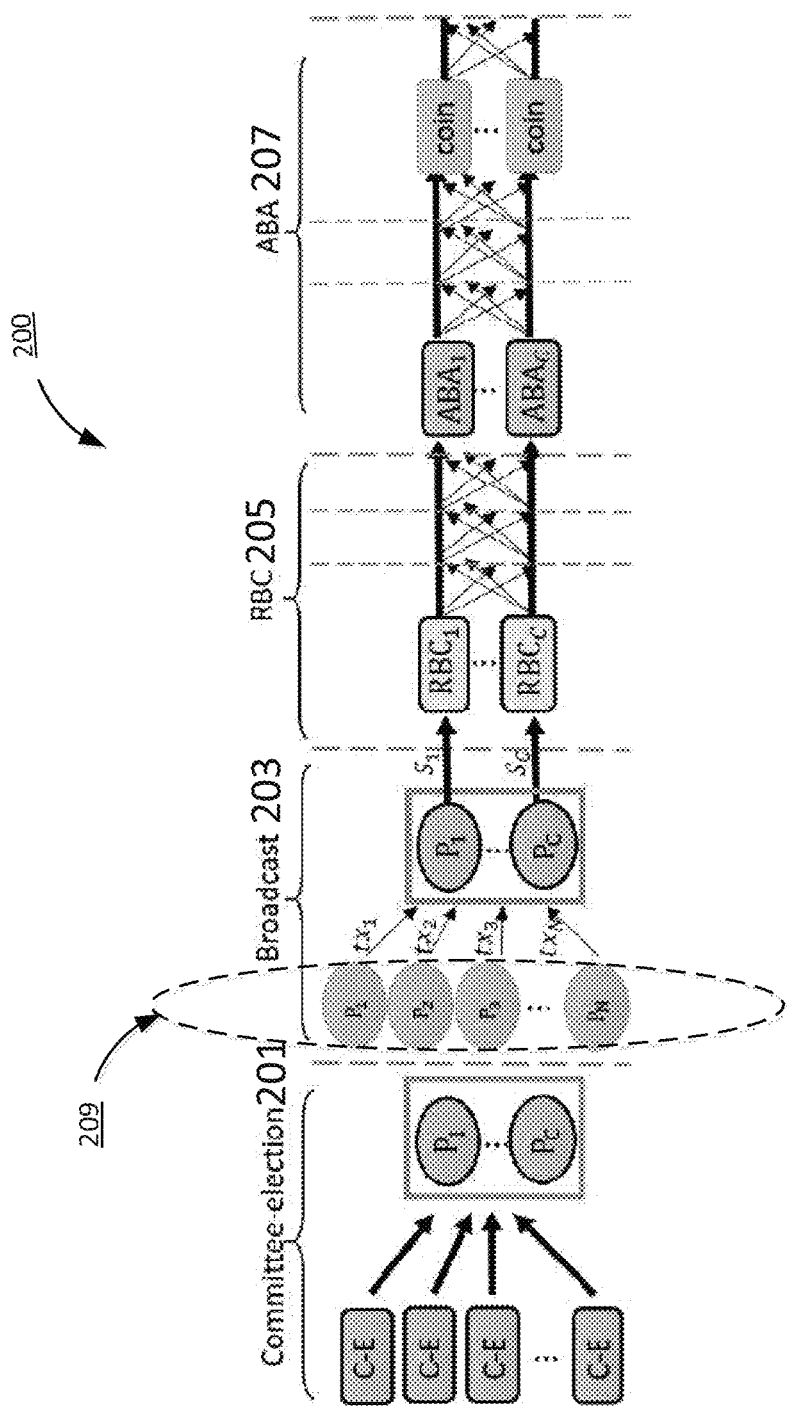
FIG. 2 depicts an exemplary process of a consensus protocol in accordance with an exemplary embodiment.

FIG. 2 depicts an exemplary process of an asynchronous BFT consensus protocol that uses asynchronous common subset (ACS) protocol in accordance with an exemplary embodiment. Process 200 illustrates the stages involved in generating a consensus for one or more transactions received in Network 100. The first stage, of the consensus protocol, can include a committee-election process implemented by the peer 101A-N, by executing a leader election module (e.g., leader election module 913 described with reference to FIG. 9). Committee-election protocol 201 can be a protocol in which a subset of the peers 101A-N in Network 100, are elected to generate a consensus about a transaction that is input to Network 100 via one of the peers 101A-N. The elected subset of the peers 101A-N can be referred to as peer leaders. The election process can be based at least in part on a number corresponding to possible/assumed faulty or untrustworthy peers in Network 100. For example if there are assumed to be f faulty or untrustworthy peers in network 100, and the number of faulty or untrustworthy nodes f is relatively small, an honest peer can determine the number of peers 101A-N elected.

The peer leaders can be elected based on an election protocol executing concurrently on all N peers. Each peer outputs a k-sized committee set comprising a subset (C) of the N peers such that at least one of the k nodes in C is a correct node (honest node is also called correct node). In some embodiments, the election protocol can be referred to as a $(1, k, \in)$-committee election protocol if it satisfies the following properties, with an overwhelming probability $1-\in-negl(\lambda)$, where $negl(\lambda)$ is a negligible function in cryptographic security parameter and E is a security parameter which may be very small. A node may become corrupted when it is hacked or taken control of by an adversarial peer or another device external to the network formed by the peers executing the protocols described herein. The parameter E is chosen by a system administrator when configuring a network of peers executing the protocols described herein. In some embodiments, the value of E can also be used to determine the number of peers included in the committee set k. A property that a $(1, k, \in)$-committee election protocol satisfies is termination of the protocol. That is, if there are f+1 correct peers executing the election protocol, any transactions transmitted by among the correct peers will arrive at their intended destination, and the election protocol will eventually terminate. Another property that a $(1, k, \in)$-committee election protocol satisfies is that all participating correct peers must output the same committee C.

Peer election can be based on a round robin approach, or random selection of peers to be included in subset C. In some embodiments, the randomized approach may be based at least in part on a first property called validity and a second property called unpredictability. Validity ensures that $i\in 1,2,\ldots k$-(i) $|C|=k$, (ii) the probability of every peer in C is same, and (iii) C contains at least one honest node with at least probability $1-\in$; the probability of the adversary to predict the returned committee is exponentially small.

The second stage is a broadcast protocol 203. Broadcast protocol 203 can be a protocol executing on peers 101A-N. In data-reliable broadcast protocol 203, each of the peers 101A-N broadcasts a transaction to all the elected peers. The elected peers can be a subset of peers 101A-N where the size of the subset is equal to k as mentioned above. Data-reliable broadcast protocol 203 can ensure that there is always an agreement among the peers 101A-N regarding a transaction, that totality is maintained across honest peers, and validity is maintained for an honest sender. One or more peers 101A-N are in agreement if each of the one or more peers 101A-N output a transaction, and the transaction output by each of the one or more peers 101A-N is the same. If an honest peer transmits a transaction, then all other honest peers will also transmit the transaction, thereby enabling the peers 10A-N to exhibit totality. If a peer inputs a transaction, and the peer is an honest peer, all peers who receive the transaction from the honest peer will output the transaction.

The third stage, of the consensus protocol, can be a reliable broadcast implemented by the elected subset of the peers 101A-N, where the elected subset of the peers 101A-N broadcast a set of indices associated with transactions that they received during broadcast 203 to the other peers in the elected subset of the peers 101A-N. The elected subset of the peers 101A-N can execute an index broadcast module in accordance with index broadcast module 915 described with reference to FIG. 9. Index-reliable broadcast 205 can be initiated by the elected subset of the peers 101A-N after they have received N-f transactions during reliable broadcast 203. Each index reliable broadcast can be used to broadcast the indices indicating which N-f transactions that an elected on of the peers 101A-N has already received.

The fourth stage, of the consensus protocol, can be a binary agreement protocol implemented across the elected subset of the peers 101A-N. The elected subset of the peers 101A-N can execute a binary agreement module in accordance with binary agreement module 917. During the binary agreement 207 stage, each peer, in the elected subset of peers, may input a single binary digit (bit) into an instance of an executable binary agreement module, and the instance of the executable binary agreement module outputs a single bit in return. When the input bit is equal to 1, the input bit indicates that an elected one of the peers 101A-N has received a transaction corresponding to an index that it received during index reliable broadcast 205. When the input bit is equal to 0, the input indicates that the elected one of the peers has not received a transaction corresponding to an index that it received during index reliable broadcast 205. The binary agreement protocol implemented in the fourth stage ensures that the output from any instance of the binary agreement executing on the elected subset of the peers 101A-N is the same. This may be referred to as agreement amount output values. The binary agreement protocol also ensures that every elected one of the peers 101A-N outputs a bit if it receives a bit. This can be referred to as termination. The binary agreement protocol can also ensure that if an elected one of the peers 101A-N outputs a bit, then at least another one elected peers 101A-N receives the outputted bit as an input. This may be referred to as validity.

Figure 3:
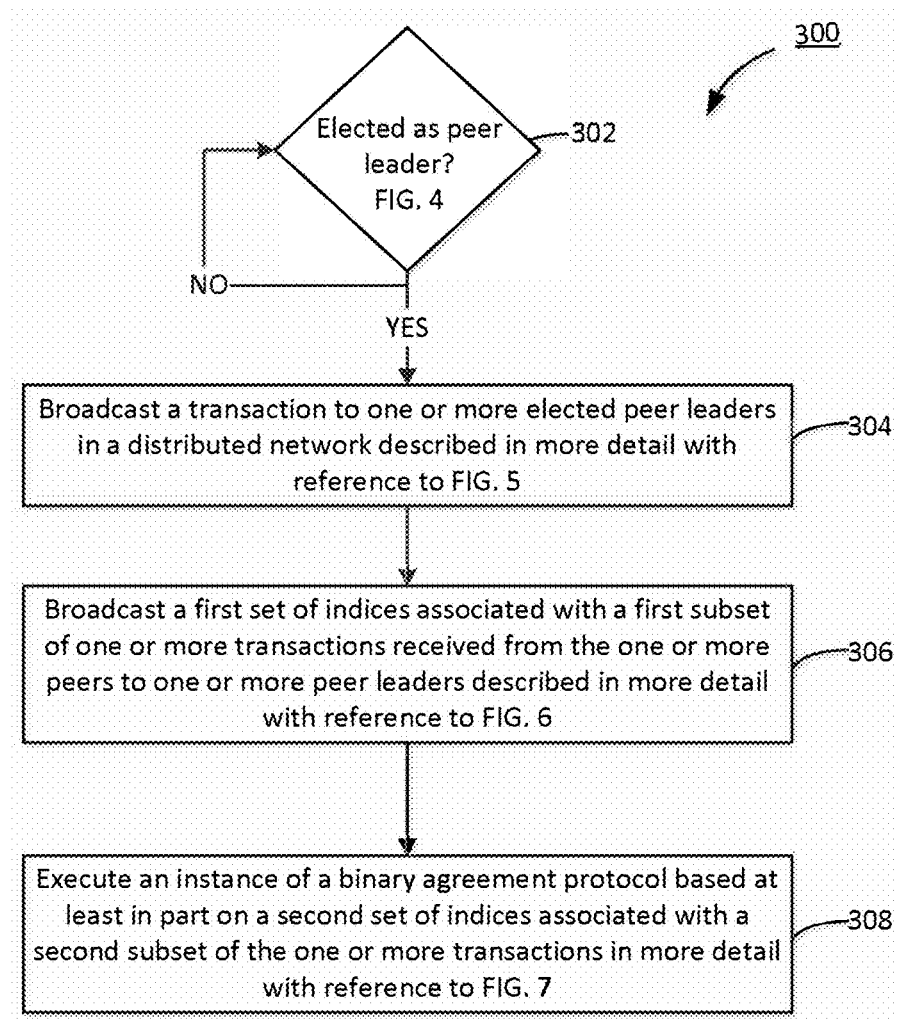
FIG. 3 is an exemplary flowchart depicting a consensus protocol process in accordance with an exemplary embodiment.

FIG. 3 is an exemplary flowchart depicting a process 300 associated with a consensus protocol in accordance with an exemplary embodiment. The operations in process 300 can be implemented by the peers (e.g., peers 101A-N) in a network (e.g., network 100). For example, a peer in network 100 can execute instructions 909 described with reference to FIG. 9 in order to implement the operations in process 300. More specifically, a processor in each of the peers in network 100 can execute instructions associated with leader election module 913, transaction broadcast module 911, index broadcast module 915, and binary agreement module 917 described with reference to FIG. 9 to implement operation 302, 304, 306, and 308, respectively.

At operation 302, a set of peer leaders can be elected (a subset of a total number peers in the network), where at least one of the elected peer leaders is an honest peer as described above. The process of electing peer leaders is described with reference to process 400 in FIG. 4.

At operation 304, a peer can broadcast a transaction to one or more elected peer leaders in a distributed network. For example, peer 101A may receive a transaction that network 100 can verify based on the consensus protocol described in process 300. Peer 101A can execute instructions associated with transaction broadcast module 911 which can cause peer 101A to broadcast the transaction to the set of elected peer leaders which is a subset of peers 101A-N in network 100. The process of broadcasting the transaction to one or more peer leaders is described with reference to process 500 in FIG. 5.

After peer leaders are elected, the process can advance to operation 306, at which one of the peer leaders broadcasts a first set of indices, associated with a first subset of one or more transactions received from the one or more peers, to one or more of the other peer leaders. For example, peer 101A can be elected as a peer leader and can broadcast a first set of indices to other peer leaders in network 100 (e.g., to peers 101B and 101C), where the first set of indices correspond to a subset of one or more transactions that were input to network 100 by peers 101A-N. The process of generating and broadcasting the first set of indices described with reference to process 600 in FIG. 6.

The process can advance to operation 308, at which an instance of a binary agreement protocol is executed based at least in part on a second set of indices associated with a second subset of the one or more transactions. For example, peer 101A can receive a second set of indices from peer leader 101E. The second set of indices can be equivalent to the first set of indices associated with peer 101A, in that peer 101E broadcasts a set of indices associated with the first N-f peers from which peer 101E received transactions. Returning to the example above, because peer 101A broadcast the set of indices to peers 101E and another peer in network 100, and all of these peers are peer leaders, peers 101E and the other peer leader, can execute instructions that cause them to perform the binary agreement protocol based on the indices that they received from peer 101A. Peers 101E and the other peer leader can execute instructions associated with binary agreement module 917 (FIG. 9), thereby causing these peer leaders to input a value into the instance of the binary agreement and await an output from the instance of the binary agreement. Similarly peer 101A can execute instructions associated with binary agreement module 917, thereby causing peer 101A to input a value to the binary agreement protocol based on the second set of indices. The process of executing an instance of the binary agreement protocol is described with reference to process 700 in FIG. 7.

After all instances of the binary agreement protocol have been executed process 300 can end.

Figure 4:
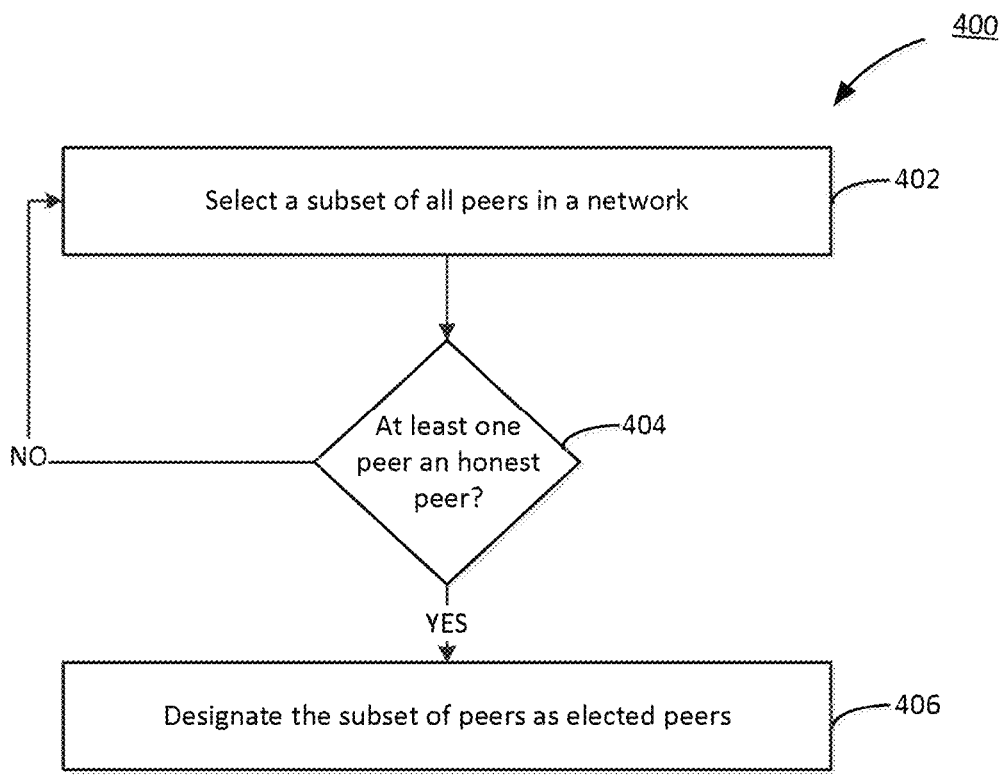
FIG. 4 is an exemplary flowchart depicting a committee election process associated with a consensus protocol in accordance with an exemplary embodiment.

The process of electing a peer leader in accordance with the consensus protocol is depicted in process 400 in FIG. 4. At operation 402, a subset of all of the peers in network 100 can be elected. The size of the subset can be any value k that is less than or equal to the total number of peers in network 100; k≤N. Each peer in network 100 may perform operation 402. At operation 404, the subset of the peers will be analyzed to determine if there is at least one honest peer in the subset in accordance with the(1, k, ∈)-committee election protocol described above. If the operation determines that the there is not at least one honest peer the operation may return to operation 402. If the operation determines that there is at least one honest peer, the operation may proceed to operation 406. At operation 406, the operation may designate the subset of peers in network 100 as elected peers.

Figure 5:
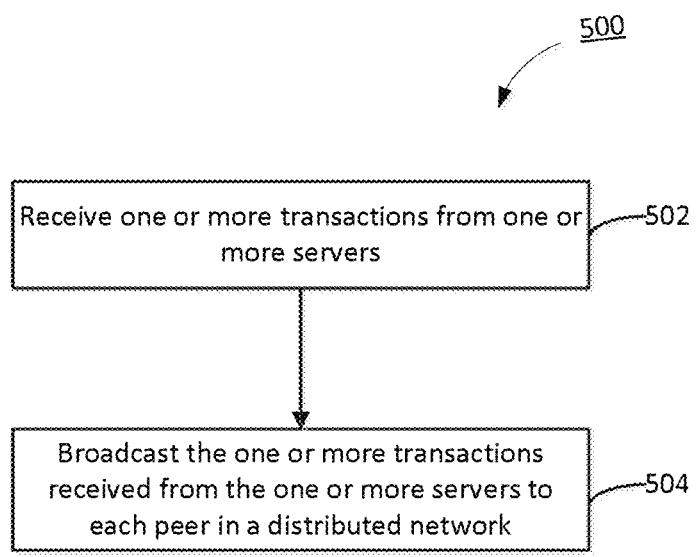
FIG. 5 is an exemplary flowchart depicting a broadcasting process associated with a consensus protocol in accordance with an exemplary embodiment.

The consensus protocol broadcasting process for broadcasting transactions is depicted in process 500 in FIG. 5. At operation 502, one or more transactions are received from one or more servers that may be external to network 100. For example, peer 101A may buffer the one or more transactions so that they are input serially into network 100. At operation 504, the transaction can be broadcast by the leader peer 101A using a reliable broadcast protocol, as described above, to each of the peer leaders in network 100 in operation 404. Returning to the example above, peer 101A can execute instructions associated with transaction broadcast module 911 (FIG. 9) that cause leader peer 101A to broadcast the transaction to the set of peers leaders in network 100. After the peer broadcasts the transaction to each of the peer leaders in network 100, each peer leader can execute an instance of a binary agreement protocol to determine an output vector of the transactions input into network 100 (e.g., operation 308 shown in FIG. 3).

Figure 6:
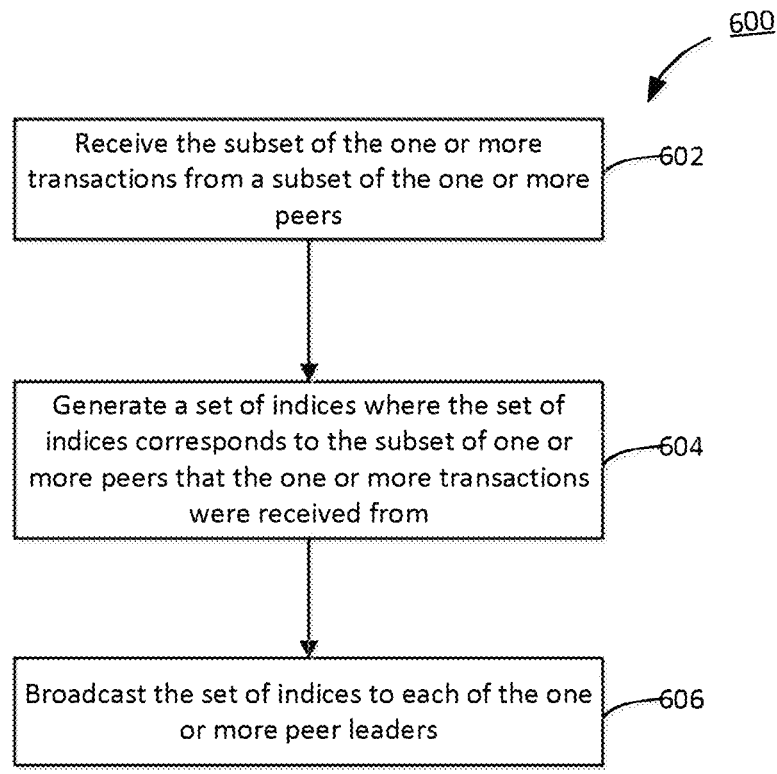
FIG. 6 is an exemplary flowchart depicting an index broadcasting process associated with a consensus protocol in accordance with an exemplary embodiment.

The consensus protocol broadcasting process for broadcasting indices associated with the broadcasted transactions is depicted in process 600 in FIG. 6. At operation 602, a subset of the one or more transactions can be received by the elected peer leaders from a subset of the one or more peers, and the elected peer leaders can generate a first set of indices where the first set of indices corresponds to the one or more peers that the one or more transactions were received from at operation 604. For example, after each peer leader $P_j$, for $j \in (1 \ldots C)$ receives a subset of N-f of the total number of one or more transactions input to the network by any of the peers, where C is the number of peer leaders and the one or more transactions are denoted by $\{v_{i_1} \ldots v_{i_{N-f}}\}$. Each peer leader can generate a set of indices $S_j = \{i_1 \ldots i_{N-f}\}$ where each index in $S_j$ corresponds to a transaction in $\{v_{i_1} \ldots v_{i_{N-f}}\}$ that each peer leader received in the transaction from operation 302 in FIG. 3. For example, peer 101A can receive N-f transactions, each of which are received from N-f peers in network 100, and can record a set of indices associated with each of the N-f peers from which peer 101A received the transactions. For instance, if peer 101A receives a transaction ($\{v_{i_B}, v_{i_C}, v_{i_D}\}$) from each of peers 101B-101D respectively, peer 101A generates a set of indices $\{i_B, i_C, i_D\}$ each of which corresponds to a broadcast transmission from each of peers 1101B-D.

After the process generates the first set of indices, the process proceeds to operation 606 at which the first set of indices is transmitted from the peer 101A to each of the elected peer leaders. Returning to the example above, after peer 101A generates the first set of indices; peer 101A can broadcast the first set of indices, by executing index broadcast module 915 (FIG. 9), to each peer leader. It should be noted that in this example, peers 101B-D may or may not be peer leaders. It could be the case that peer 101E and another peer in network 100 are peer leaders, in which case peer 101A can broadcast the set of indices to both peer 101E and the other peer leader in network 100.

Figure 7:
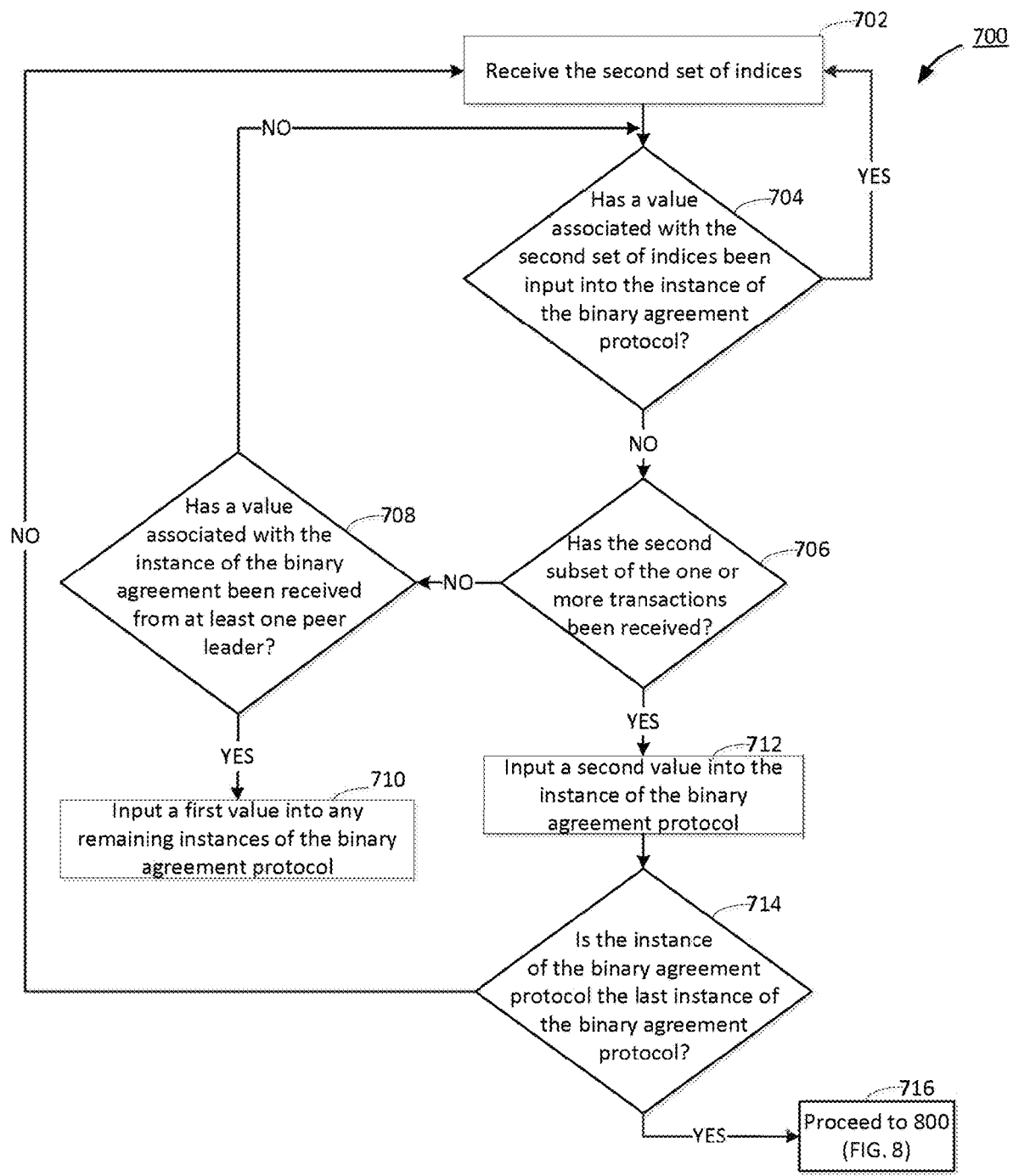
FIG. 7 is an exemplary flowchart depicting a binary agreement process associated with a consensus protocol in accordance with an exemplary embodiment.

The consensus protocol binary agreement associated with the consensus protocol is depicted in process 400 in FIG. 7. At operation 702, the second set of indices can be received by the peer leaders. Continuing with the example given above, peer 101A can receive a second set of indices from peer 101E. At operation 704, it can be determined by each peer leader whether a value associated with the second set of indices has been input into the instance of the binary agreement protocol. If it is determined that a value has been input into the instance of the binary agreement protocol associated with the second set of indices, the process can return to operation 702. Returning to the example above, if peer 101A has already input a value into the binary agreement protocol then peer 101A can wait for another second set of indices and restart process 700. Continuing with this example, peer 101A can input a value into the instance of the binary agreement protocol before peer 101A receives the second set of indices, if it has already received the transactions associated with the second set of indices before it receives the second set of indices. This can happen if peer 101A receives the transactions associated with the second set of indices when the transactions are initially broadcast by peers in the network (operation 302). If this happens, peer 101A can ignore the second set of indices that it receives and wait until it receives another set of indices (return to operation 702).

If the peer leader determines that a value has not been input into the instance of the binary agreement protocol that is associated with the second set of indices, the process can proceed to operation 706. At operation 706, the peer leader can determine whether the second subset of the one or more transactions has been received. Returning to the example above, if peer leader 101A has received the second set of indices from peer 101E, peer leader 101A may or may not have received the transactions associated with the second set of indices. If peer leader 101A has not received the transactions when the transactions are initially broadcast by peers in the network (operation 302 in FIG. 3), peer leader 101A can determine if a value associated with the instance of the binary agreement has been received from at least one other peer leader (operation 708 in FIG. 7). If peer leader 101A has received an input value associated with the instance of the binary agreement (e.g., a bit value of "1"), peer leader 101A can input a first value into any remaining instances of the binary agreement protocol (e.g., a bit value of "0") (operation 710 in FIG. 7). Returning to operation 706, if peer leader 101A determines that it has received the second subset of the one or more transactions, peer leader can input a second value in the instance of the binary agreement protocol (e.g., a bit value of "1") and then determine whether second value has executed the last instance of the binary agreement protocol (operation 714 in FIG. 7). If it is not the last instance of the binary agreement protocol, peer leader 101A can wait until it receives another set of indices (return to operation 702). If peer leader 101A has executed the last instance of the binary agreement protocol, peer leader 101A determines an output vector associated with all of the instances of the binary agreement protocol (operation 716).

Figure 8:
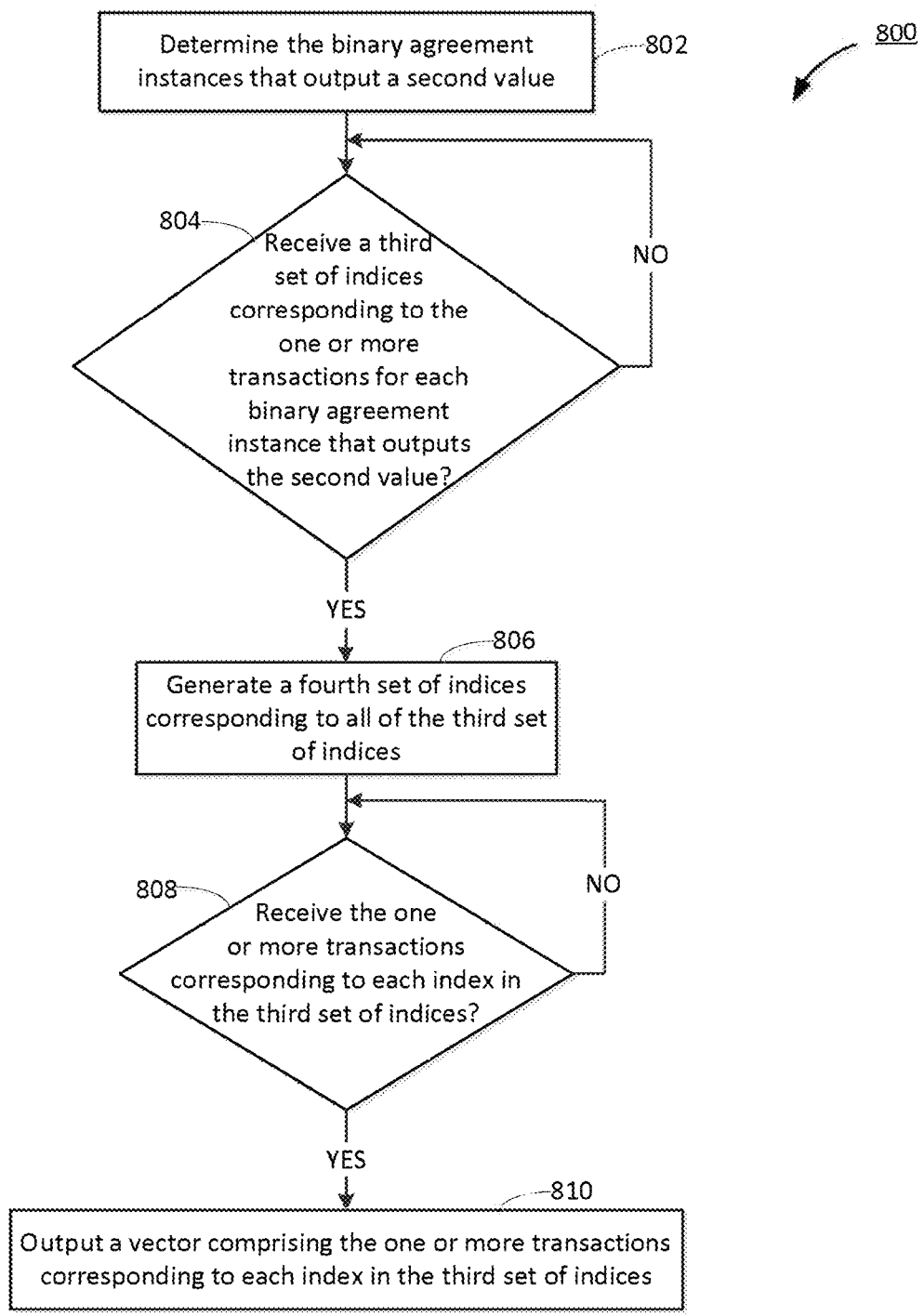
FIG. 8 is an exemplary flowchart depicting a process of outputting a consensus vector of transactions input by peers to a network associated with a consensus protocol in accordance with an exemplary embodiment.

The process of generating and broadcasting an output consensus vector associated with the initial transactions the first set of indices is described with reference to process 800 in FIG. 8. At operation 802, the peer leader can determine which binary agreement instances have output a second value (e.g., a bit value of "1"). Returning to the example above, as peer leader 101A goes through process 700 until it has executed all of the instances of the binary agreement, leader peer 101A can determine which instances of the binary agreement have output a bit value of "1". After leader peer 101A determines which instances of the binary agreement have output a bit value of "1", leader peer 101A can determine whether it has received a third set of indices corresponding to the one or more transactions for each binary agreement instance that outputs the second value at operation 804. For example, peer leader 101A can receive a set of indices corresponding to a subset of the one or more transactions from peer 101E and another set of indices corresponding to another subset of the one or more transactions from another peer. The third set of indices is a set containing the set of indices received from peer 101E and the set of indices received from the other peer. If peer leader 101A does not receive both sets of indices, peer leader 101A can return to operation 804 until peer leader 101A receives the set of indices corresponding to the instances of the binary agreement that output a bit value of "1". If peer leader 101A does receive both sets of indices, peer leader 101A generate a fourth set of indices at operation 806 that corresponds to all of the third set of indices. For example, peer leader 101A can generate a union of all of the set of indices in the third set of indices. Returning to the example above, peer leader 101A can generate a set of the union of the set of indices received from peer 101E and the set of indices received from the other peer.

After generating the union of the set of indices, peer leader 101A can progress to operation 808 in the process and determine whether peer leader 101A has received the one or more transactions corresponding to each index in the third set of indices. If has not, peer leader 101A can return to operation 808 until it does receive the one or more transactions. Once peer leader 101A receives the one or more transactions it can output a vector comprising the one or more transactions corresponding to each index in the third set of indices (operation 810). The output vector is the set of one or more transactions that were input by the peers in network 100 requiring a consensus.

FIG. 9 is a block diagram of an example peer server or node 901 for implementing exemplary embodiments of the present disclosure. The peer server 901 may be, but is not limited to, a desktop computer, laptop, server or network appliance, portable computing device, tablet, and the like. The peer server 901 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 907 included in the peer server 901 may store computer-readable and computer-executable instructions or software (e.g., applications such as the transaction broadcast module 911, leader election module 913, index broadcast module 915, and binary agreement module 917) for implementing exemplary operations of the peer server 901. The peer server 901 also includes configurable and/or programmable processor 903 and associated core(s) 905, and optionally, one or more additional configurable and/or programmable processor(s) and associated core(s) (for example, in the case of computer systems having multiple processors/cores), for executing computer-readable and computer-executable instructions or software stored in the memory 907 and other programs for implementing exemplary embodiments of the present disclosure. Processor 903 may be a single core processor or multiple core processors. Processor 903 may be configured to execute one or more of the instructions described in connection with peer server 901.

Virtualization may be employed in the peer server 901 so that infrastructure and resources in the computing device 900 may be shared dynamically. A virtual machine may be provided to handle a process running on multiple processors so that the process appears to be using only one computing resource rather than multiple computing resources. Multiple virtual machines may also be used with one processor.

Memory 907 may include a computer system memory or random access memory, such as DRAM, SRAM, EDO RAM, and the like. Memory 907 may include other types of memory as well, or combinations thereof.

A user may interact with the peer server 901 through a visual display device, such as a computer monitor, which may display one or more graphical user interfaces, multi touch interface, a pointing device, an image capturing device and a scanner.

The peer server 901 may also include one or more database storage 917, such as a hard-drive, CD-ROM, or other computer-readable media, for storing data and computer-readable instructions and/or software that implement exemplary embodiments of the present disclosure (e.g., applications). For example, exemplary database storage 917 can include one or more databases 928 for storing data associated with transactional broadcast module data 919, leader election module data 921, index broadcast module data 923, and/or binary agreement module data 925. The database storage 917 may be updated manually or automatically at any suitable time to add, delete, and/or update one or more data items in the databases.

The peer server 901 can include a network interface 919 configured to interface via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the peer server 901 can include one or more antennas to facilitate wireless communication (e.g., via the network interface) between the peer server 901 and a network and/or between the peer server 901 and other computing devices. The network interface 919 may include a built-in network adapter, network interface card, PCMCIA network card, card bus network adapter, wireless network adapter, USB network adapter, modem or any other device suitable for interfacing the peer server 901 to any type of network capable of communication and performing the operations described herein.

The peer server 901 may run any operating system, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the peer server 901 and performing the operations described herein. In exemplary embodiments, the operating system may be run in native mode or emulated mode. In an exemplary embodiment, the operating system may be run on one or more cloud machine instances.

Figure 10:
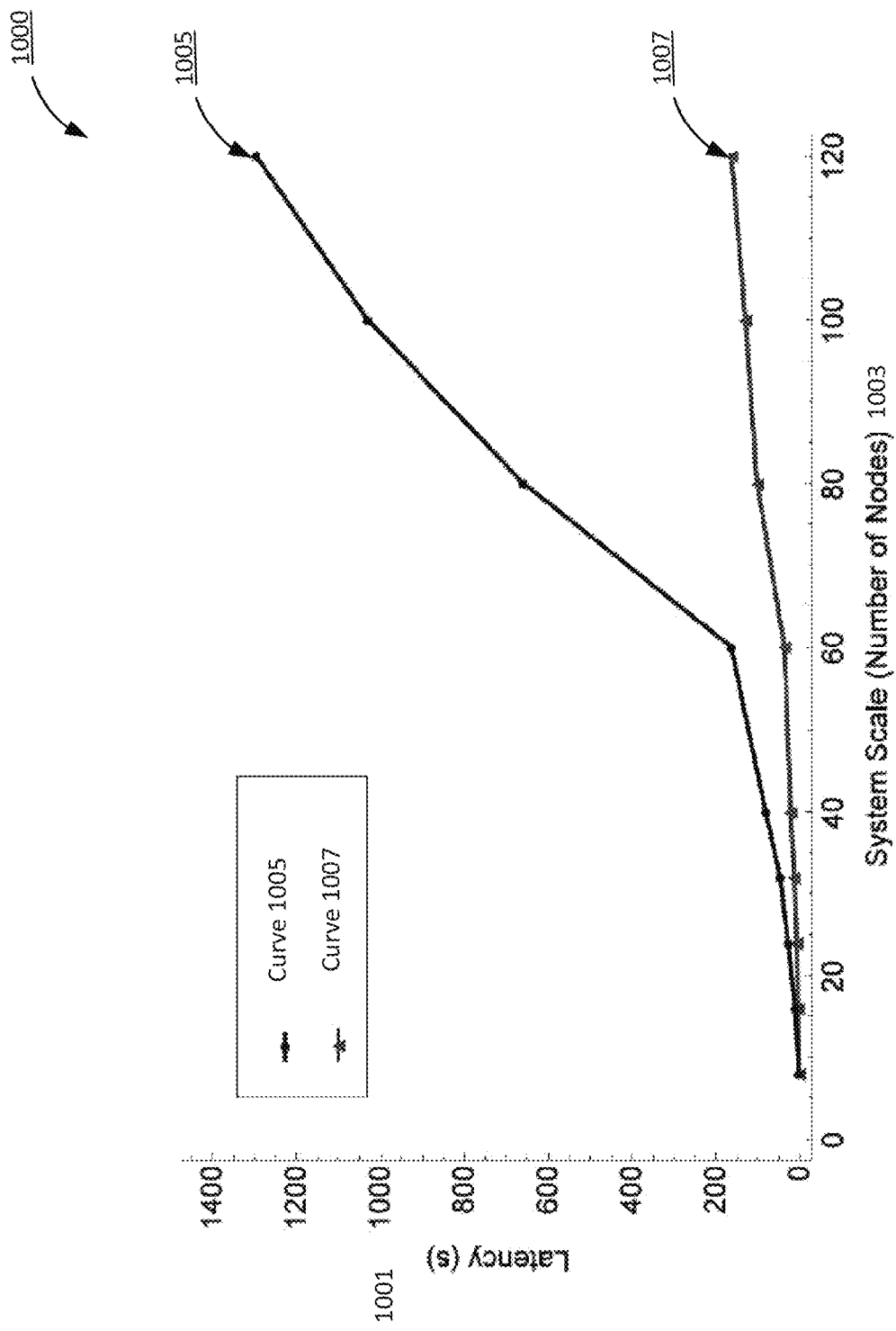
FIG. 10 is a graph depicting a performance metric associated with a consensus protocol in accordance with an exemplary embodiment.
Figure 11:
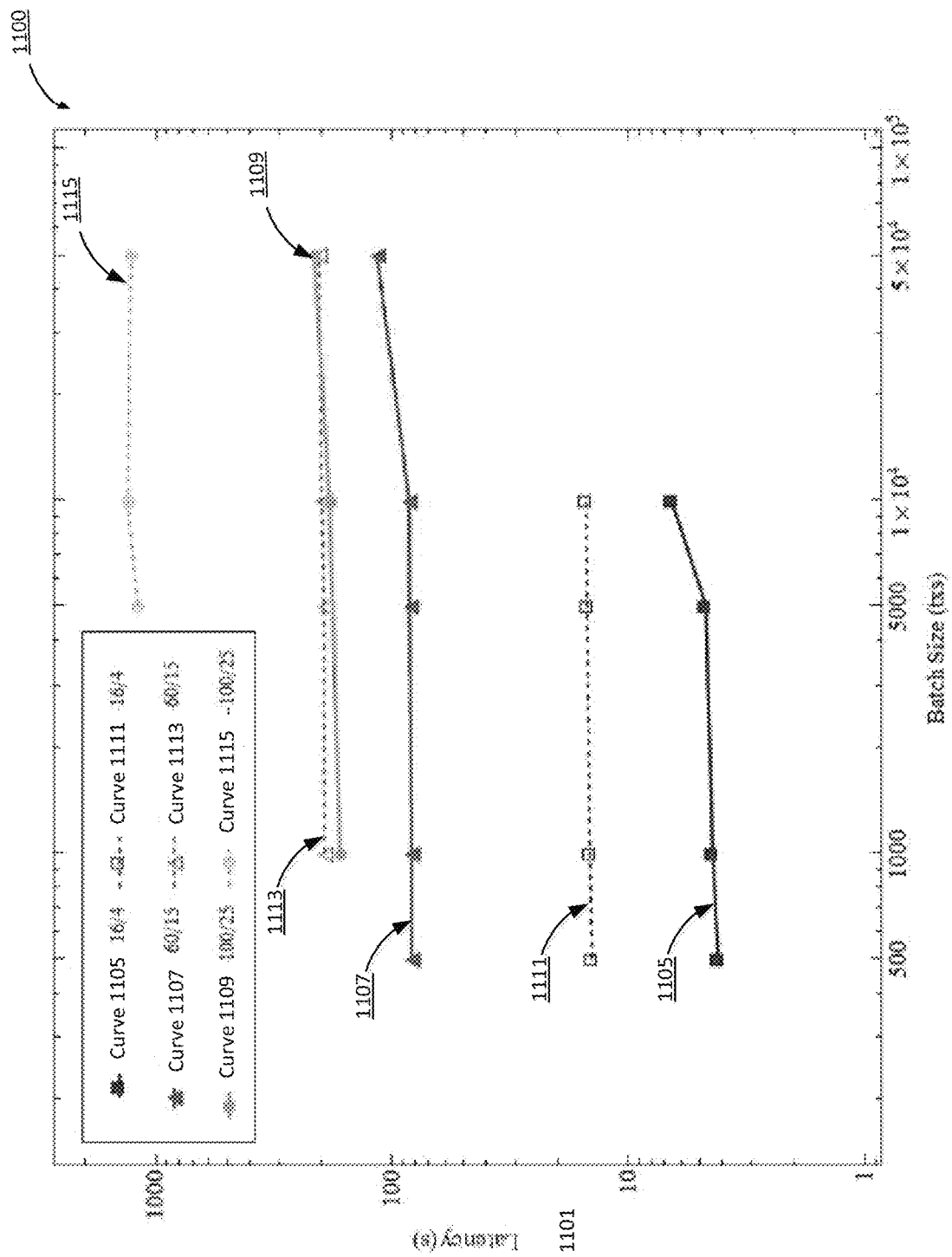
FIG. 11 is a graph depicting a performance metric associated with a consensus protocol in accordance with an exemplary embodiment.
Figure 12:
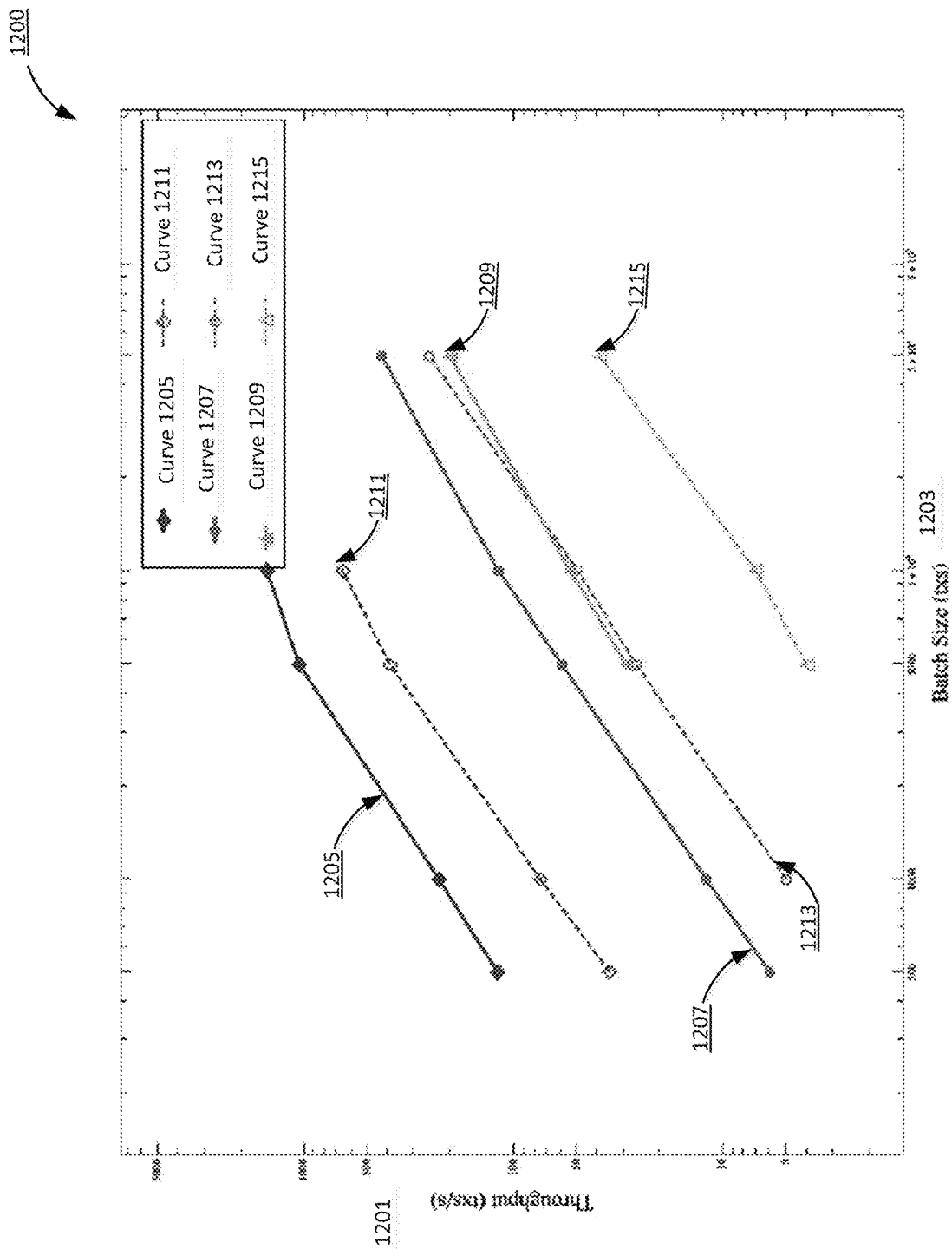
FIG. 12 is a graph depicting a performance metric associated with a consensus protocol in accordance with an exemplary embodiment.

FIGS. 10-12 illustrate experimental results of an example embodiment of the consensus protocol described herein with reference to FIGS. 3-8. FIG. 10 is a graph that shows latency (y-axis) as a function of the number of nodes (peers) (x-axis). FIG. 11 is a graph that shows latency (y-axis) as a function of batch size of transactions (x-axis). FIG. 12 is a graph that shows throughput (y-axis) as a function of batch size of transactions (x-axis). As illustrated by the experimental results shown in FIGS. 10-12, the example embodiment of the consensus protocol improves the throughput and latency experienced by one or more peers in a real world WAN as compared to conventional consensus protocols that are used to arrive at a consensus about one or more transactions that are input by peers into WAN. The comparison is between the two protocols in different system scale and load sizes. As the number of peers is increased, the example embodiment of the consensus protocol describe with reference to FIGS. 3-8 provides a substantial practical advantage over existing consensus protocols, allowing it to achieve better throughput and latency.

The example embodiment of the consensus protocol described herein was executed on 60 servers physically located in 2 different cities separated by 600 miles. In order scale the size of the WAN network beyond 60 peers, two virtual machines were installed on each server so that the number of peers could be increased from 0 up to 120. Each virtual machine represents a peer in the WAN network. Each server is equipped with a quad core Intel Xeon Golden 6146 CPU (3.2 GHz) and 16 GB memory. The bandwidth is 100 Mbps, and the communication channels are established using ordinary TCP sockets.

The WAN network is parameterized with a network tolerance of N/4 untrustworthy peers, and an probability, $\in = 10^{-8}$, set by a network administrator that is used to determine an upper bound on the number of peers, k, included in the committee set C. The probability corresponds to a situation in which there are no honest peers if k peers are elected at random out of the N peers. The number k, may be bounded from above by the probability in accordance with the following expression $$\left(\frac{1}{4}\right)^k < \epsilon.$$

The probability may be used to determine the number of untrustworthy peers present in the network at any given time. In some instances, the number of untrustworthy peers can be equal to f+1. It can be seen that as the number of peers in the WAN scales from 16 to 100 that the throughput and latency experienced by the WAN when the peers are executing the example embodiment of the consensus protocol described herein is better than the throughput and latency experienced by the WAN when the peers are executing a conventional consensus protocol. This is due to the fact that example embodiment of the consensus protocol described herein performs a binary agreement on an aggregated set of indices corresponding to a subset of transactions that are input into the WAN, whereas the conventional consensus protocol performs a binary agreement on each and every transaction. This causes the conventional consensus protocol to increase latency in the WAN and to decrease the throughput because the conventional consensus protocol has to use more bandwidth because it must execute more instances of the binary agreement protocol.

Throughput is defined as the number of transactions committed in a given unit of time. That is the throughput can be the number of transactions that are input in a given second. Latency is defined as the amount of time needed to finish an epoch of the protocol.

In FIG. 10 the latency 1001 vs the number of nodes 1003, or peers, in the WAN, associated with the example embodiment of the consensus process described herein is depicted as curve 1005. The latency 1001 as a function of the number of nodes 1003, or peers, in the WAN, associated with a conventional consensus protocol is depicted as curve 1007.

In FIG. 11 the latency 1101 for different latency of each batch size of transmissions 1103, for the example embodiment of the consensus process described herein, is depicted as curve 1105, for a WAN with 16 peers, 1107 for a WAN with 60 peers, and 1109, for a network of 100 peers. The latency 1101 for batch size of transmissions 1103, for a conventional consensus protocol, is depicted as curve 1111, for a WAN with 6 peers, 1113, for a WAN with 60 peers, and 1115, for a WAN with 100. As can be seen in FIG. 11, the gap between the curve for the example embodiment of the consensus process and the curve for the conventional consensus protocol widens as the number of peers in the WAN increases from 6 peers to 100 peers. For example, for a WAN of 100 peers the latency of the consensus protocol according to the example embodiment for a batch size of 5000 transmissions is slightly nearly 200 seconds, whereas the latency of the conventional consensus protocol is greater than 1000 seconds. Accordingly, the example embodiment implementing the consensus protocol described herein experiences less latency than the conventional consensus protocol while producing a higher throughput.

In FIG. 12 the throughput 1201 for each batch size of transmissions 1203, for the example embodiment of the consensus process described herein, is depicted as curve 1205, for a WAN with 16 peers, 1207 for a WAN with 60 peers, and 1209, for a network of 100 peers. The throughput 1201 for each batch size of transmissions 1203, for a conventional consensus protocol, is depicted as curve 1211, for a WAN with 16 peers, 1213, for a WAN with 60 peers, and 1215, for a WAN with 100 peers. As can be seen in FIG. 12, the gap between the curve for the example embodiment of the consensus process described herein and the curve for the conventional consensus protocol widens as the number of peers in the WAN increases from 8 peers to 100 peers. For example, for a WAN of 100 peers the throughput of the consensus protocol according to the example embodiment for a batch size of 1,000,000 transmissions is 50 transactions per second, whereas the throughput of the conventional consensus protocol is about 7 transactions per second. Accordingly, the consensus protocol in process 300 is more efficient than the conventional consensus protocol, and produces a higher throughput.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for determining the validity of a transaction in a distributed network environment, the system comprising:
a plurality of peer servers, wherein a first peer server of the plurality of peer servers comprises:
one or more processors and memory storing computer-executable instructions, wherein the one or more processors execute the computer-executable instructions, to cause the one or more processors to:
elect at least one peer leader from the plurality of peer servers based on an election protocol executing on the plurality of peer servers, wherein each peer server outputs a k-sized committee set comprising a subset of the peer servers such that at least one node is a correct node and wherein, based on a threshold number of correct peers executing the election protocol, the election protocol establishes that transactions transmitted by the correct peers will arrive at an intended destination and operation of the election protocol terminates;

broadcast a first set of indices associated with a first subset of transactions, received from the plurality of peer servers, to one or more of the plurality of peer servers;

execute a first instance of a binary agreement protocol based at least in part on a second subset of indices associated with a second subset of the transactions; and output a consensus vector comprising one or more of the transactions.

2. The system of claim 1, wherein the one or more of the plurality of peer servers are elected to be peer leaders.

3. The system of claim 2, wherein a number of the plurality of peer servers that are elected to be the peer leaders is based at least in part on a number of the plurality of peer servers that are assumed to be untrustworthy or faulty.

4. The system of claim 2, wherein the one or more of the plurality of peer servers elected to be the peer leaders is a first subset of the plurality of peer servers.

5. The system of claim 4, wherein the one or more processors are further configured to:

generate a set of indices, wherein the set of indices corresponds to the first subset of the plurality of peer servers from which the one or more processors received the first subset of transactions.

6. The system of claim 1, wherein the one or more processors, are further configured to:

receive the second subset of the transactions from a second subset of the plurality of peer servers.

7. The system of claim 6, wherein the one or more processors are further configured to:

input a first value into the first instance of the binary agreement protocol based at least in part on the second subset of indices.

8. The system of claim 7, wherein the first input value is a binary number.

9. The system of claim 7, wherein the one or more processors are further configured to:

determine at least one second instance of the binary agreement protocol that has output the first value.

10. The system of claim 9, wherein the one or more processors are further configured to:

output the consensus vector based at least in part on the determination that the at least one second instance of the binary agreement protocol has output the first value.

11. A method for determining the validity of a transaction in a distributed network environment, the method comprising:

electing at least one peer leader from a plurality of peer servers based on an election protocol executing on the plurality of peer servers, wherein each peer server outputs a k-sized committee set comprising a subset of the peer servers such that at least one node is a correct node and wherein, based on a threshold number of correct peers executing the election protocol, the election protocol establishes that transactions transmitted by the correct peers will arrive at an intended destination and operation of the election protocol terminates;

broadcasting a first set of indices associated with a first subset of transactions, received from the plurality of peer servers, to one or more of the plurality of peer servers;

executing a first instance of a binary agreement protocol based at least in part on a second subset of indices associated with a second subset of the transactions; and outputting a consensus vector comprising one or more of the transactions.

12. The method of claim 11, wherein the one or more of the plurality of peer servers are elected to be peer leaders.

13. The method of claim 12, wherein a number of the plurality of peer servers that are elected to be the peer leaders is based at least in part on a number of the plurality of peer servers that are assumed to be untrustworthy or faulty.

14. The method of claim 12, wherein the one or more of the plurality of peer servers elected to be the peer leaders is a first subset of the plurality of peer servers.

15. The method of claim 14, further comprising:

generating a set of indices, wherein the set of indices corresponds to the first subset of the plurality of peer servers from which the one or more processors received the first subset of transactions.

16. The method of claim 11, wherein the method further comprises:

receiving the second subset of the transactions from a second subset of the plurality of peer servers.

17. The method of claim 16, wherein the further comprises:

inputting a first value into the first instance of the binary agreement protocol based at least in part on the second subset of indices.

18. The method of claim 17, wherein the first input value is a binary number.

19. The method of claim 17, wherein the method further comprises:

determining at least one second instance of the binary agreement protocol that has output the first value.

20. A non-transitory computer-readable medium storing computer-executable instructions stored therein, which when executed by at least one processor, cause the at least one processor to perform the operations of:

electing at least one peer leader from a plurality of peer servers based on an election protocol executing on the plurality of peer servers, wherein each peer server outputs a k-sized committee set comprising a subset of the peer servers such that at least one node is a correct node and wherein, based on a threshold number of correct peers executing the election protocol, the election protocol establishes that transactions transmitted by correct peers will arrive at an intended destination and operation of the election protocol terminates;

broadcasting a first set of indices associated with a first subset of transactions, received from the plurality of peer servers, to one or more of the plurality of peer servers;

executing a first instance of a binary agreement protocol based at least in part on a second subset of indices associated with a second subset of the transactions; and outputting a consensus vector comprising one or more of the transactions.

* * * * *